United States Patent [19]

Munro

[11] Patent Number: 5,094,149
[45] Date of Patent: Mar. 10, 1992

[54] PISTONS HAVING A COMPONENT INCORPORATED THEREIN

[75] Inventor: Robert Munro, Lymington, England

[73] Assignee: AE Piston Products Limited, Bradford, England

[21] Appl. No.: 565,368

[22] Filed: Aug. 10, 1990

[30] Foreign Application Priority Data

Aug. 26, 1989 [GB] United Kingdom ............... 8919466

[51] Int. Cl.5 ............................................. F16J 1/04
[52] U.S. Cl. .................................... 92/222; 92/223; 92/231; 92/260; 123/193.6; 29/888.04; 29/888.044; 29/888.049; 29/888.05
[58] Field of Search ................. 92/208, 211, 213, 222, 92/223, 230, 231, 260; 123/193 P; 29/888.04, 888.042, 888.044, 888.047, 888.048, 888.049, 888.05

[56] References Cited

U.S. PATENT DOCUMENTS

| 4,008,051 | 2/1977 | Cadle | 123/193 P |
| 4,233,490 | 11/1980 | Shalai | 92/222 |
| 4,318,438 | 3/1982 | Ban et al. | |
| 4,651,631 | 3/1987 | Avezou | 123/193 P |
| 4,899,702 | 2/1990 | Sasaki et al. | 123/193 P |
| 4,972,898 | 11/1990 | Cole | 164/98 |
| 4,987,867 | 1/1991 | Suzuki et al. | 92/222 |

FOREIGN PATENT DOCUMENTS

| 278239 | 12/1987 | Japan . | |
| 312931 | 12/1988 | Japan . | |
| 0117970 | 5/1989 | Japan | 123/193 P |
| 1487117 | 9/1977 | United Kingdom . | |
| 2016976 | 9/1979 | United Kingdom . | |
| 2129523 | 5/1984 | United Kingdom | 123/193 P |
| 2132524 | 7/1984 | United Kingdom . | |

Primary Examiner—Edward K. Look
Assistant Examiner—Thomas Denion
Attorney, Agent, or Firm—William R. Hinds

[57] ABSTRACT

Pistons and a method for making them are described. The pistons have reinforcing components, such as piston ring groove inserts, incorporated therein. The reinforcements have one or more porous bodies joined thereto, for example, by brazing and which are infiltrated during casting of the piston.

11 Claims, 2 Drawing Sheets

PISTONS HAVING A COMPONENT INCORPORATED THEREIN

The present invention relates to the manufacture of light alloy pistons having components for improving one or more properties such as wear resistance, fatigue strength and thermal erosion resistance.

Aluminium alloy pistons having ferrous piston ring carrier inserts in which the piston ring grooves are formed in order to give improved wear resistance over the aluminium alloy are well known. They are usually bonded to the piston body by use of the known "Alfin" process (trade mark). This process produces a bond between the ferrous alloy and the aluminium alloy which is both brittle and relatively weak.

In modern highly rated diesel engines, for example, its performance is marginal with an increasing number of field failures in engines.

U.S. Pat. No. 4,334,507 describes the use of porous, sintered inserts incorporated into the piston by a pressure casting technique. It has been found, however, by the present applicants that such sintered inserts tend to either increase the rate of piston ring wear or that the piston ring groove wears rapidly, both of which are undesirable.

More recently, in British patent application number 8915427.2 of common ownership, there is described a method whereby the ring groove insert is sprayed with a coating of stainless steel powder, for example, and is subsequently encast into a piston by squeeze casting. The result of this method has been to virtually double the bond strength over the known "Alfin" process and to ameliorate the brittle nature of the bond between the insert and the aluminium alloy.

It is an object of the present invention to improve the bond reliability between a component and the surrounding aluminium alloy still further.

According to a first aspect of the present invention a method for the incorporation of a component into a piston comprises the steps of forming and joining a porous body to the component by sintering a metal powder to the component, placing the porous body and component into a piston casting die, pouring molten metal into the die such that the porous body becomes infiltrated with molten metal and allowing the molten metal to solidify.

It is intended that the components in question may encompass such things as piston ring groove reinforcement inserts, piston crown, combustion bowl inserts and bushes used for reinforcement of the gudgeon pin bosses, for example; this list being exemplary and not exhaustive.

The porous body may, in one embodiment of the method, be formed by sintering loose powder, to the component.

Alternatively, the method may comprise forming a separate porous body and joining the porous body to the component. The separate porous body may be formed, for example, by die pressing of metal powder and which body may be subsequently sintered and joined to the component.

The porous body may be formed from any suitable powder such as ferrous based material or copper based material, for example.

In the case of piston ring groove reinforcement the invention is especially beneficial where single sided inserts are used to improve wear resistance of the lower ring groove face only.

The present invention may also be combined with spraying of certain faces of the components such as is described in GB 8915427.2 of common ownership herewith.

According to a second aspect of the present invention there is provided a piston having at least one component incorporated therein when made by the method of the first aspect.

In accordance with this second aspect, there is provided a piston having at least one reinforcing member incorporated therein, the reinforcing member being selected from the group consisting of piston ring groove reinforcement, combustion bowl insert, piston crown and gudgeon pin cross-hole bushes, the at least one reinforcing member having at least one porous body joined thereto, and the porous body being infiltrated with the metal from which the piston is made, the porous body comprising a body of sintered metal powder sintered to the reinforcing member so as to be strongly adherent thereto.

There is also provided, in accordance with the second aspect, a piston having a component incorporated therein, the component being joined to a porous body distinct from the component, the porous body being infiltrated with the metal from which the piston is made, the porous body comprising a body of sintered metal powder sintered to the component so as to strongly adhere to the component, and being formed by sintering a loose metal powder to the component.

The second aspect also provides a piston having an annular piston ring groove reinforcement which reinforces substantially only the lower face of the piston ring groove, the reinforcement having a porous body joined to the face remote from the crown surface of the piston, the porous body being infiltrated with the metal from which the piston is made, the porous body comprising a body of sintered metal powder sintered to the reinforcement face remote from the crown surface of the piston so as to strongly adhere to the reinforcement.

Still further, the second aspect provides a piston having an annular piston ring groove reinforcement which reinforces both upper and lower faces of the piston ring groove, the annular reinforcement having on its outside surface, upper and lower, generally radially directed faces and a generally axially directed face on its inner periphery wherein said upper and lower, generally radially directed faces have porous bodies joined to them, at least one of the porous bodies comprising a sintered metal powder body sintered to a respective said generally radially directed face so as to strongly adhere to the reinforcement.

In order that the present invention may be more fully understood, examples will now be described by way of illustration only with reference to the accompanying drawings, of which:

Figure 1:
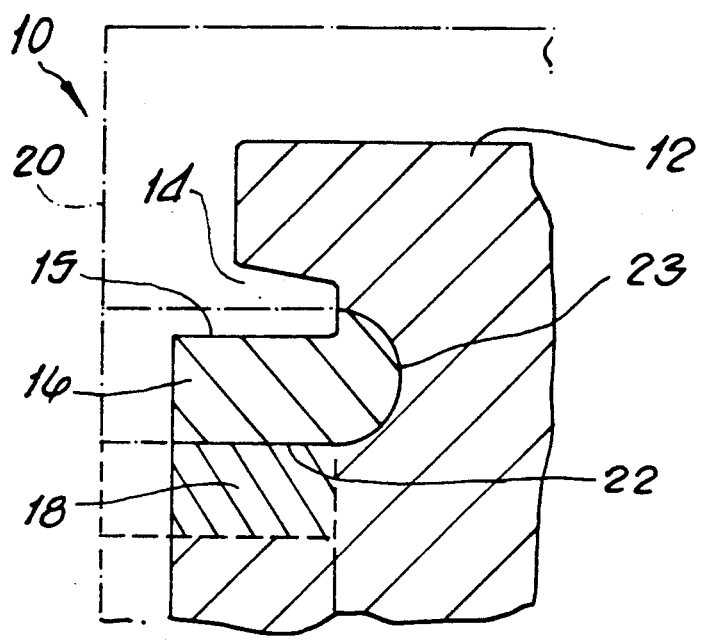
FIG. 1 shows a section through a single sided piston ring groove reinforcement having a porous body attached thereto.
Figure 6:
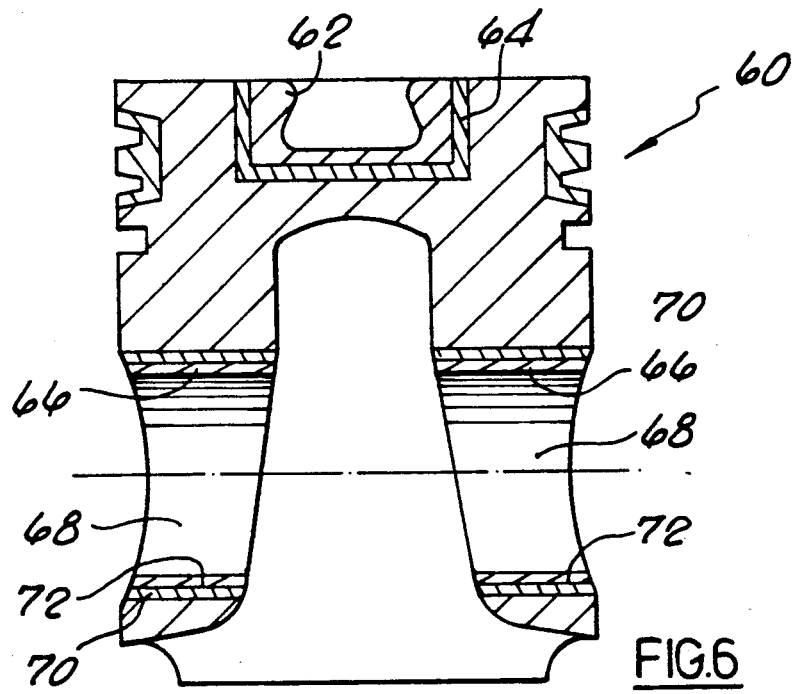
Figure 7:
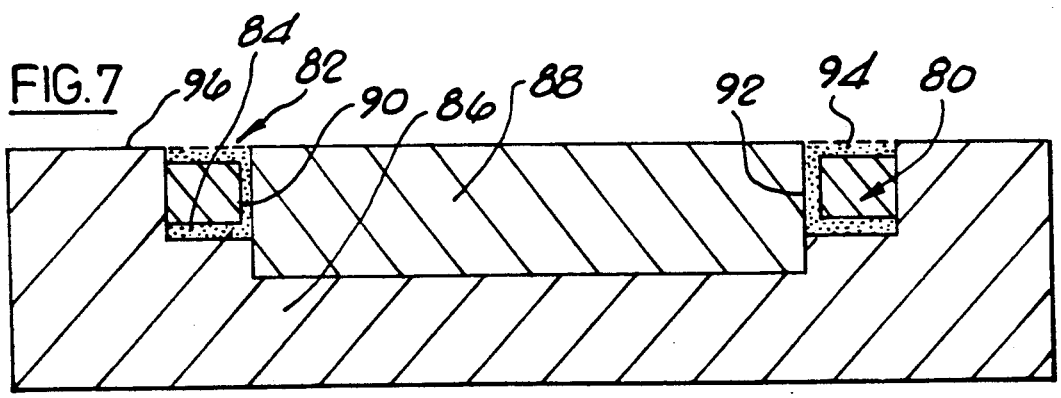

FIG. 6 shows a piston having a combustion bowl insert and gudgeon pin boss bushes and FIG. 7 shows a ring groove reinforcement insert having a layer of powder sintered directly to it Referring now to FIG. 1 and where the top ring groove region of the crown end of a piston is denoted at 10. The piston comprises an aluminium-silicon alloy body 12. The piston ring groove 14 has a lower face 15 machined into an annular, austenitic cast iron insert 16 to which is bonded by brazing, a porous ring 18. The piston crown is shown after machining; the chain dotted lines 20 indicating the profiles of the components after casting of the piston body and prior to machining. The porous ring 18 is produced by die pressing of an appropriate powder followed by sintering and is first brazed to the lower face 22 of the insert 16 with sufficient material to provide a strong bond but also ensuring that sufficient porosity remains to allow impregnation of the porosity by the aluminium alloy which is cast by a known squeeze casting technique. The rear curved face 23 of the insert may be sprayed with a stainless steel powder as described in GB 8915427.2.

Figure 2:
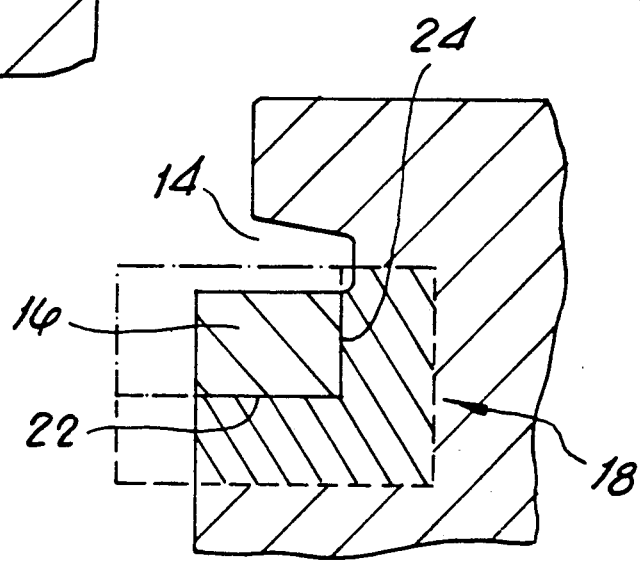
FIG. 2 shows a first modification of the embodiment of FIG. 1.

FIG. 2 shows a modification where the annular porous body 18 has an 'L'-shaped section which when brazed to the ring groove reinforcing inserts 16 provides a strong bond to the piston alloy on both faces 22 and 24.

Figure 3:
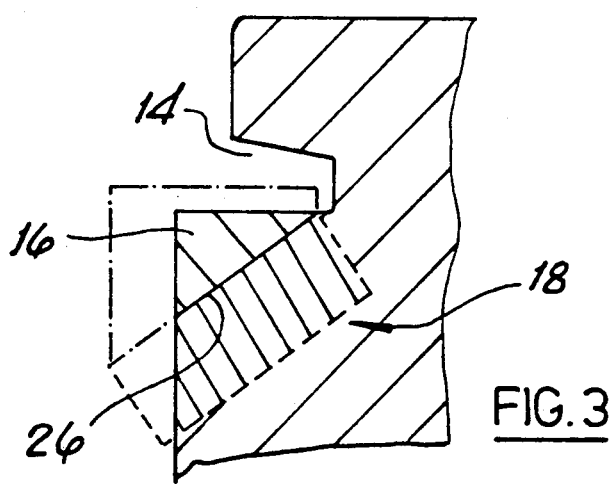
FIG. 3 shows a second modification of the embodiment of FIG. 1.

FIG. 3 shows an insert which effectively has only one face, 26, bonded to the piston body after machining.

Figure 4:
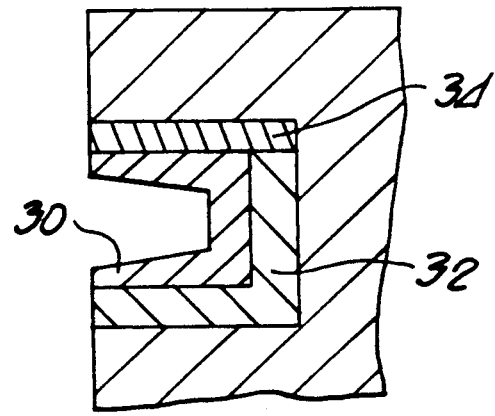
FIG. 4 shows a full piston ring groove reinforcement having porous bodies attached thereto.

FIG. 4 shows a full piston ring groove reinforcing member 30 having two porous bodies 32, 34 brazed on. The body 32 has an 'L'-shaped cross section whilst body 34 is a flat ring.

Figure 5:
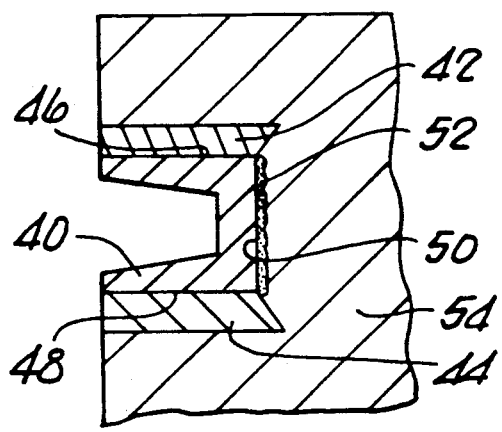
FIG. 5 shows a modification of the embodiment of FIG. 4.

FIG. 5 shows an insert 40 having two, flat porous rings 42, 44 brazed to the upper and lower, generally radially extending faces 46, 48. The rear, generally axially directed face 50 has a plasma sprayed coating 52 of a stainless steel powder. The squeeze cast piston alloy 54 infiltrates the micro porosity of the sprayed coating 52 in addition to the flat rings 42, 44 and provides a strong bond.

FIG. 6 shows a piston 60 having a combustion bowl insert 62 to which is brazed a porous, generally cup-shaped body 64. Bronze bushes 66, to reinforce the gudgeon pin cross-holes 68, have porous bronze bushes 70 brazed onto their outer diameters 72.

FIG. 7 depicts an austenitic iron ring 80 intended to reinforce the piston ring groove of a piston (not shown). The ring 80 has sintered to it a layer 82 of a bronze 10% tin—powder having generally spherical particles of between—85 and +120 B.S. mesh. To form the layer 82 a first layer 84 of the powder is placed in a die 86 having a central core 88, the die and core being made of graphite. The iron ring 80 which has a copper plated layer 90 is then placed on the first layer 84. More powder is then added to fill the annular space 92 and provide a surface 94 level with the upper die surface 96 The complete assembly of die, core, ring and powder is then placed in a conveyor furnace having a reducing atmosphere of 25% vol. hydrogen and 75% vol. nitrogen and is sintered at approximately 835° C. for 10 minutes. After sintering the powder strongly adheres to the ring and which may be incorporated into a piston as described above.

Although squeeze casting has been given above as the example of a pressure casting technique it is intended to encompass any casting technique which is operated at other than ambient pressure. Thus, vacuum or reduced pressure infiltration, for example, is also deemed to be included as a pressure casting technique.

I claim:

1. A piston having an annular piston ring groove reinforcement which reinforces substantially only the lower face of the piston ring groove, said reinforcement having a porous body joined to the face remote from the crown surface of the piston, said porous body being infiltrated with the metal from which the piston is made, said porous body comprising a body of sintered metal powder sintered to said reinforcement face remote from the crown surface of the piston so as to strongly adhere to said reinforcement.

2. A piston according to claim 1 wherein the radially inner peripheral surface of said annular reinforcement has a curved cross sectional shape.

3. A piston according to claim 1 also having a porous body of sintered metal powder sintered to the inner peripheral face of said annular reinforcement.

4. A piston according to claim 3 wherein said porous body sintered to said face remote from the piston crown and the porous body sintered to said inner peripheral face of the reinforcement are formed as a single piece porous body having an 'L'-shaped cross section.

5. A piston having an annular piston ring groove reinforcement which reinforces both upper and lower faces of the piston ring groove, the annular reinforcement having on its outside surface, upper and lower, generally radially directed faces and a generally axially directed face on its inner periphery wherein said upper and lower, generally radially directed faces have porous bodies joined to them, at least one of said porous bodies comprising a sintered metal powder body sintered to a respective said generally radially directed face so as to strongly adhere to said reinforcement.

6. A piston according to claim 5 wherein said inner, generally axially directed face also has a porous body of sintered metal powder sintered to it.

7. A piston according to claim 5 wherein said inner, generally axially directed face has a porous body comprising a plasma sprayed layer joined to it.

8. A piston having at least one reinforcing member incorporated therein, the reinforcing member being selected from the group consisting of piston ring groove reinforcement, combustion bowl insert, piston crown and gudgeon pin cross-hole bushes, the at least one reinforcing member having at least one porous body joined thereto, and said porous body being infiltrated with the metal from which the piston is made, said porous body comprising a body of sintered metal powder sintered to said reinforcing member so as to be strongly adherent thereto.

9. A piston as claimed in claim 8 having bushes to reinforce gudgeon pin cross holes wherein said bushes have porous bushes joined to their outer diameters.

10. A piston as claimed in claim 8 having a combustion bowl insert, said insert having a generally cup-shaped porous body joined to it.

11. A piston having a component incorporated therein, the component being joined to a porous body distinct from said component, the porous body being infiltrated with the metal from which the piston is made, said porous body comprising a body of sintered metal powder sintered to said component so as to strongly adhere to said component, and being formed by sintering a loose metal powder to said component.

* * * * *